June 8, 1943.   N. ROHATS   2,321,424
TESTING OF ELECTRICAL WINDINGS
Filed June 26, 1942   2 Sheets-Sheet 1
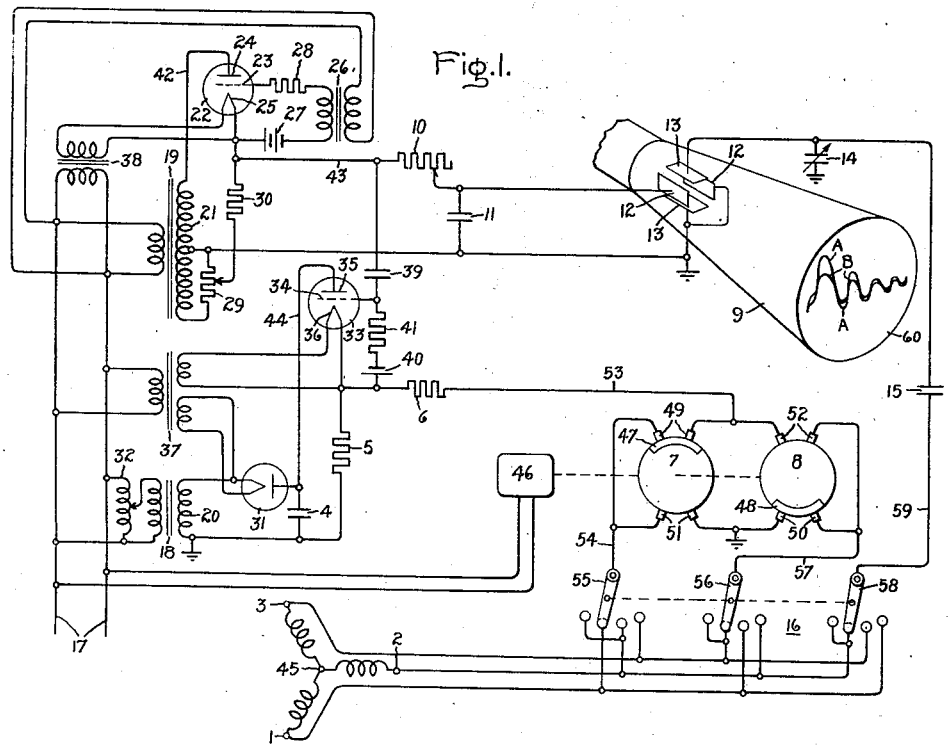
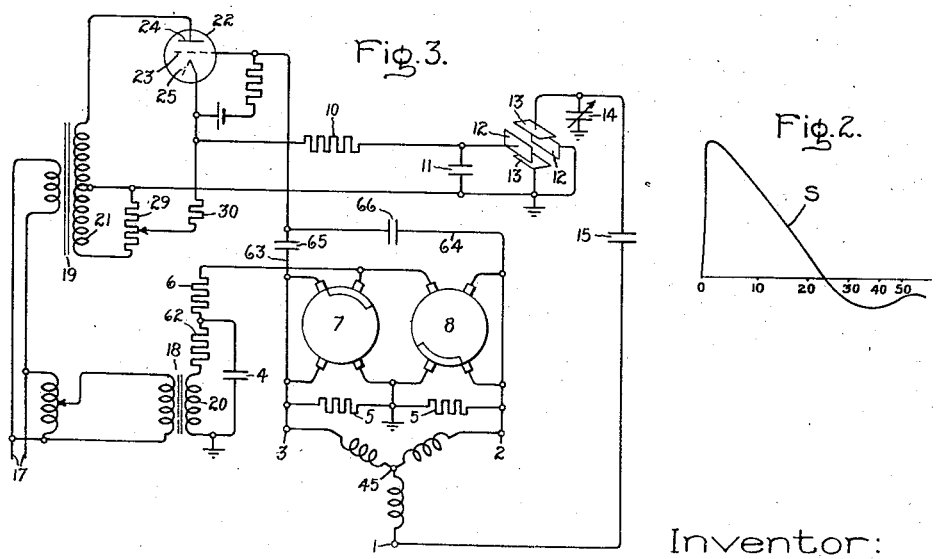
Inventor:
Nicholas Rohats,
by Harry E. Dunham
His Attorney.

June 8, 1943.    N. ROHATS    2,321,424
TESTING OF ELECTRICAL WINDINGS
Filed June 26, 1942    2 Sheets-Sheet 2
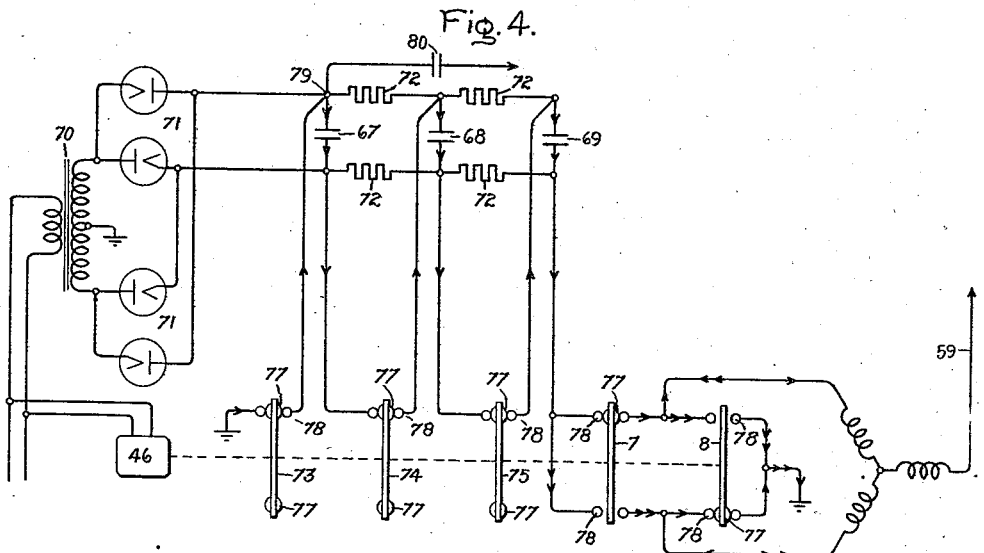
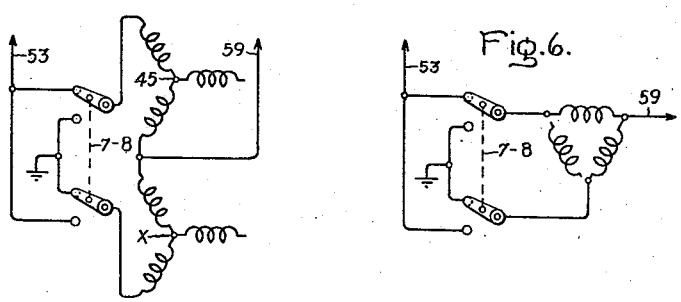
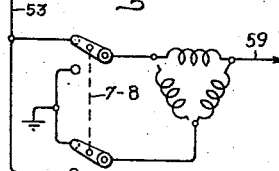
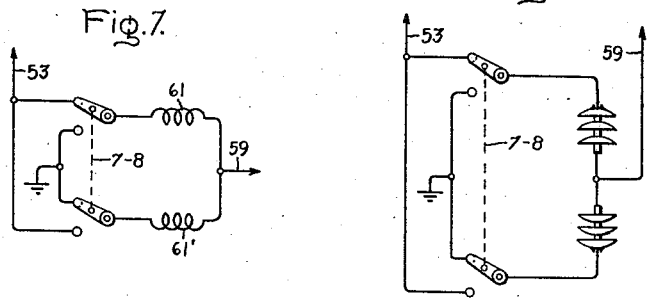
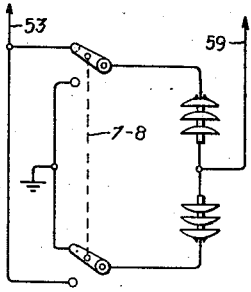
Inventor:
Nicholas Rohats,
by Harry E. Dunham
His Attorney.

Patented June 8, 1943

2,321,424

UNITED STATES PATENT OFFICE 2,321,424

TESTING OF ELECTRICAL WINDINGS

Nicholas Rohats, Scotia, N. Y., assignor to General Electric Company, a corporation of New York Application June 26, 1942, Serial No. 448,562

4 Claims. (Cl. 175—183)

My invention relates to a method of and apparatus for testing electrical apparatus such as windings and has for its main object a practicable and rapid method of testing the turn-to-turn, coil-to-coil, and winding-to-ground insulation of electrical windings simultaneously. A further object of the invention is to detect dissimilarities between different phases or windings which are supposed to be similar.

It has long been the practice to subject the windings of electrical apparatus to high potential tests before leaving the factory to ascertain if the insulation between winding and ground and between separable phases is satisfactory. For example, a standard high potential test of a 2300 volt, 60 cycle, three phase motor has been to connect about 5600 volts, 60 cycles between the winding and the frame of the machine to see if the insulation breaks down and if the phases are separable to connect the same voltage between different phases to test the phase to phase insulation. Such tests do not detect defects in the insulation between turns of the same winding or between different coils of the same winding. Also, in cases where the different phases of a polyphase machine are permanently connected internally such test is not applicable for testing the insulation between different phases. Moreover, this usual high potential test does not subject the insulation which is tested to the character of surge voltages which experience has taught generally causes insulation failures in service. Insulation failures in service are invariably caused by switching and lighting surges of a steep wave front and not by excessive voltages of line frequency which seldom if ever occur.

According to my invention insulation tests are made with a steep front surge voltage approximating in character that which causes insulation breakdowns in service. My insulation test not only tests the insulation from winding to ground and between separable phases but also between all turns and coils and between phases which are permanently connected. All of these tests are made quickly and simultaneously. This test also shows up differences between different phases of a polyphase winding or between two different single phase windings which are supposed to be similar and where the dissimilarity is caused by a difference in the number of turns, for example, or for any other reason.

In carrying my invention into effect, I provide surge voltage generating apparatus for producing suitable steep wave front surge voltages. I subject a pair of phases or windings to be tested to such surge voltages in series relation to ground and alternately reverse the direction of the surge therethrough in quick succession and compare the surge voltages which exist at the center point of the circuit tested under the reversed conditions. Any dissimilarity in the two phases or windings caused by failure of insulation from winding to ground, between turns, coils or phases or dissimilarity caused by differences in the connections or for any other reason is revealed by a difference between the surge voltages which exist at the mid-point of the test circuit.

I have found it advantageous to employ the oscillograph electric transient analyzer of the character described in my U. S. Letters Patent 2,094,472 to supply the surge voltage and indicate the presence of a fault.

The features of my invention which are believed to be novel and patentable will be pointed out in the claims appended hereto. For a better understanding of my invention reference is made in the following description to the accompanying drawings in which Fig. 1 shows an embodiment of my invention employing the transient analyzer of my prior patent and a synchronously operated reversing switch as applied to the testing of polyphase windings. Fig. 2 is a curve representative of the surge voltage employed. Fig. 3 shows a modified arrangement where the cathode ray oscillograph is controlled in synchronism by the reversing switch; Fig. 4 shows a surge generator arrangement suitable for use where very high surge voltages are required for making tests on correspondingly high voltage windings; Figs. 5 to 8 inclusive indicate test connections for various different purposes.

In Fig. 1, I have shown a surge capacitor 4 and a surge discharge circuit including the parallel resistor 5, the series resistor 6, the synchronous switch 7 and 8, and the test sample 1, 2, 3. A suitable oscillograph 9 is provided for observing the shape and magnitude of the surge. A timing circuit including suitable resistors 10 and capacitor 11 is also provided for coordinating the oscillograph and the surge generator.

Any suitable type of oscillograph may be employed but, owing to the high speed with which transient phenomena take place, I prefer to employ relatively inertialess devices, such as cathode ray oscillographs or oscilloscopes, electron beam oscillographs, and other devices of a similar character having a deflecting beam co-operating with a fluorescent screen. Since such oscillographs are well known, I have not illustrated the entire oscillograph in the drawings and I have shown two elements thereof, 12 and 13, representing the means for causing the beam to traverse the screen along the two transverse axes in the customary manner. While I may use oscillographs of either the electrostatic or the electromagnetic beam deflecting type or a combination thereof, I shall refer by way of illustration to the use of an oscillograph having two pairs of electrostatic plates 12 and 13 at right angles to each other for controlling perpendicular axes, such as the oscillographs shown in United States Patent No. 1,695,719 to Rudenberg or No. 1,768,262 to Marrison.

The sweep plates 12 which are associated with the timing axis are connected to the capacitor 11 and the plates 13 which are associated with the deflection or measuring axis are connected to the windings under test through the capacitance voltage divider 14, 15 and the three-pole four-position switch 16. The arrangement is such that the capacitor 11 is charged and discharged periodically to vary the voltage on the time axis plates 12 so as to move the beam back and forth along the timing axis. The surge capacitor 4 is arranged to be discharged each time the oscillograph beam starts in a forward direction along the time axis.

The power for operating the apparatus is supplied from a source of alternating current 17 through step-up transformers 18 and 19 having secondary windings 20 and 21. Secondary 21 supplying the sweep circuit is grounded at its midpoint. A discharge tube 22 is provided for controlling the charging of the timing circuit capacitor 11 from the supply transformer winding 21. Preferably a variable resistor 10 is connected in series with the charging circuit to fix the magnitude of the charging current and the rate of travel of the oscillograph beam.

The tube 22 is preferably of the type having a control electrode 23 as well as an anode 24 and a cathode 25. The tube 22 may be of the gas or vapor-filled type in which the flow of current continues after it has been initiated, as long as sufficient voltage exists between anode 24 and the cathode 25. Preferably the discharge of tube 22 is initiated at the crests of the positive half cycles of winding 21 by means of the peaking transformer 26. This transformer 26 is of the type which gives a secondary voltage about 10 degrees wide at the crests of the primary voltage. At all other parts of the cycle the grid 23 is held negative with respect to the cathode 25 by the bias cell 27. Resistor 28 is included to limit grid currents to safe values. In this manner the timing circuit capacitor 11 is charged once for each cycle of the alternating current supplied by the source 17.

The charging of the capacitor 11 causes the beam of the cathode-ray oscillograph to be moved to one end of its travel along the timing axis by virtue of the electrostatic field produced between the timing axis plates 12. In order to bring the beam back to its starting point a potentiometer 29 connected across the lower half of 21 provides a negative potential through resistor 30 during the quarter cycle preceding the firing of tube 22.

The surge capacitor 4 is charged from transformer winding 20 through rectifier 31 which may if desired be of the discharge tube type. An auto transformer 32 is the preferred method of controlling the voltage of capacitor 4. Connection of transformer 18 to the supply circuit is such that charging of capacitor 4 takes place during the half cycle that anode 24 of tube 22 is negative. A valve 33 is interposed in the discharge circuit of the surge capacitor 4 in series with the resistors 5 and 6. The valve 33 may conveniently be a tube of the gas or vapor-filled type having a control grid 34. Such a tube is also provided with an anode 35 and a cathode 36.

Insulating step-down transformers 37 and 38 energized by the source 17 may, if desired, be provided for heating the cathodes of the tubes 22, 31 and 33.

In order to cause the valve 33 to be tripped by its control electrode 34 in synchronism with the sweeping of the cathode ray beam along its timing axis, a locking or coupling condenser 39 is provided which is connected between control grid 34 of the tube 33 and the cathode 25 of the timing circuit-controlling tube 22. Preferably, a source of potential 40 is connected between the cathode 36 and the control electrode 34 of the tube 33 in order to bias the control electrode 34 negatively and prevent tripping of the tube 33 until a positive potential impulse is applied through the condenser 39. A resistor 41 may be connected in the control electrode circuit to allow the tripping impulse to raise the potential of the control electrode 34 to the trip point.

When the voltage impressed upon anode 24 of tube 22 reaches its positive crest value the peaking transformer 26 swings its grid 23 positive causing tube 22 to become conducting and a circuit is formed through conductor 42, tube 22, the conductor 43, the resistor 10 and capacitor 11 back to ground. As the capacitor 11 is being charged its potential rises and causes the beam of the cathode-ray oscillograph to be deflected in the forward direction along the time axis. Simultaneously with the initiation of the timing motion of the beam the valve 33 is tripped owing to the fact that the flow of current through the resistor 41 causes the grid 34 to become positive. Thereupon a discharge of the surge capacitor 4 takes place through conductor 44, the valve 33 and resistor 5 to ground. Resistor 5 being quite high most of the discharge current will pass through low resistance 6 into the synchronous switches 7 and 8 and from there into the test winding 1, 2, 3.

The surges which are produced by the surge generator once per cycle are identical and the operation of the oscillograph is synchronized therewith. Hence, if identical portions of such surges are caused to influence the deflection plates of the oscillograph we would obtain repeated traces of the same wave in the same position on the oscillograph screen, resulting in a visible brilliant standing wave. If, however, alternate waves are produced by unequal portions of such surges, two standing waves will appear and will indicate such inequality. The surge which is developed across resistor 5 is impressed upon the windings of the machine under test in the manner now to be described. At 45 I have indicated a three-phase winding which may be the three-phase internal Y connected winding of a motor or a transformer, for example, having its three terminals marked 1, 2 and 3. Connected between the winding 45 and the surge generator are two switches 7—8 and 16. The manual switch 16 is not essential since the changes in connections made by it could be made by making corresponding changes at the terminals of the winding 45. Switch 16 does, however, add to the convenience of the apparatus.

Switch 7—8 is an automatic reversing switch operated by a synchronous motor 46 which, in the example given, will be assumed to be a four-pole motor and to be operated from a 60 cycle source 17 so as to operate the switch at 1800 R. P. M. or one-half revolution per cycle. The switch comprises two insulated disks 7 and 8 mounted on and driven by the motor shaft. The disks have peripheral sectors of conducting material 47 and 48 positioned 180 degrees apart, as shown. Bearing on the periphery of each disk are two sets of spaced brushes, the two sets bearing on a disk being spaced 180 degrees apart. It is seen that in the position of the switch shown brush set 49 of disk 7 is connected by conducting segment 47 and the set of brushes 50 of disk 8 is connected by conducting segment 48. When the disks rotate one-half revolution from the position shown, brushes 51 will be connected by conductor segment 47 at the same time that brushes 52 are connected by conductor segment 48. At other times the brushes of all sets are disconnected. The combination is the equivalent of a double pole, double throw switch arranged so as to be operated very rapidly, i. e., 3600 times per minute. In the position of the switches 7 and 8 shown, the surge generator is connected to ground through phases 1 and 3 of winding 45 in series as follows: through wire 53, segment 47, brushes 49, wire 54, manual switch blade 55, phase 1, phase 3, switch blade 56, wire 57, segment 48, and brushes 50 to ground. When the switch 7—8 has rotated 180 degrees from the position shown, the surge generator will again be connected to ground through phases 3 and 1 of winding 45 in series, but with phase terminals 1 and 3 reversed with respect to ground as follows: from the surge generator connection 53, segment 48 and brushes 52, connections 57 and the manual switch blade 56 to phase terminal 3, out phase terminal 1, manual switch blade 55, segment 47 and brushes 51 to ground. Thus, we have a reversing switch for reversing the direction of connection of phases 1 and 3 in series between the surge generator and ground at the rate of 3600 reversals per minute. With the surge generator also energized from the 60 cycle source it produces 3600 surges per minute. By suitably positioning the rotary positions of the disks 7 and 8, the surges thus produced may thus be alternately impressed between terminal 1 and ground and between terminal 3 and ground through phases 1 and 3 of winding 45.

It is also noted that the midpoint of the series connection through phases 1 and 3 of winding 45 is connected to one of the deflection plates 13 of the cathode ray oscillograph, as follows: through phase 2 of the winding, manual switch blade 58, connection 59 and voltage divider, 15—14. The other deflection plate 13 is connected to ground. Hence the surge voltage used to deflect the cathode ray beam of the oscillograph is a resultant of the voltage at the neutral of winding 45 and the voltage induced in phase 2 by phases 1 and 3. It is noted that phase 2 of the winding 45 is utilized for the oscillograph connection and that a connection to the center point of the series connected phases 1 and 3 might not otherwise be available. The surges which are alternatively and repeatedly impressed across terminals 1 and 3 of winding 45 may be of the character shown in Fig. 2 at S. In this figure the abscissa graduations are indicated in microseconds. The shape of the surge curve is not critical for my purposes so long as it has a steep wave front of the order of one microsecond.

It will be evident that there will be ample time for the complete surge of the character shown to be impressed upon winding 45 during the commutating periods of switch 7—8 and that the spacing of brushes 49, for example, the length of the conducting segment 47 and the phase position of the conducting segments, are not critical, since the complete surge has an effective duration of only about 0.00005 second. The nature of the surge or surges at terminal 2 of winding 45 which is produced as a standing wave or waves on the screen of the cathode ray oscillograph 9 is shown on such screen 60 in Fig. 1. As illustrated, two standing waves A and B are shown of the same general character but with wave A having a greater amplitude than wave B. This is what happens when phases 1 and 3 are dissimilar for any reason. Wave A is produced by the surge impressed in one direction and wave B is produced by a similar surge impressed through phases 1 and 3 in the opposite direction.

It is evident, and has been demonstrated by tests, that if the phases are similar the two standing waves will coincide and only one wave will be seen. However, if one phase has a shorted turn or coil or is grounded as compared to the other phase then the resulting alternate waves A and B will not coincide and the fault is thus revealed. The fault indication is very clear and pronounced. Thus, for the case of a single turn short in a 500 turn phase winding, which is the minimum kind of a fault that will be encountered, the two waves will differ by about 20% or about as shown on the screen in Fig. 1. The main reason for the difference in the two standing waves in the case of a fault or other dissymmetry is because the two phases or windings which are being compared are of different reactance. This will cause the potential at the midpoint of the test circuit to be changed, but the difference as revealed by the difference in the waves on the screen is twice as large as the relative change in reactance. The standing wave or waves, as they appear on the oscillograph screen, are more oscillating in character than the surge wave as produced by the surge generator which is to be expected because of the inductive character of the test circuit. The wave B is smaller and wave A is greater than would be the single standing wave of a no fault winding comparison test.

At any instant of the time of propagation of the surge through the winding there exists difference of potential between single turns of the winding.

Faults caused by more than one short circuited turns or by short circuited coils or a coil to ground fault in one phase will, of course, produce a greater difference in the fault indication than a single turn fault.

Having compared phases 1 and 3, switch 16 is thrown to the right to connect phases 1 and 2 in series with the oscillograph connection through phase 3 and the test is repeated. Phases 1 and 2 are now compared. If no fault is revealed by either comparison test, it is safe to assume that no fault exists either between turns or coils or phases or between any part of the winding and ground and also that the phases are balanced as to the number of turns. It is, of course, possible that exactly the same fault might exist in exactly the same point in all three phases and if so the comparison test might not reveal the same. However, this possibility is so remote that it can be ignored. A ground at the Y point of the three phases would still give a wave on the screen but this wave being only that which is induced in the phase connected to the oscillograph would be of lower amplitude and also different shape. Likewise, a ground in the phase used for the oscillograph would result in a still lower amplitude of deflection. However, this ground would be indicated in the usual way as soon as the hand switch 16 was shifted to another position.

In case of any uncertainty in the observed results of the test after comparing first phases 1 and 3 and then phases 1 and 2, phases 3 and 2 may be compared. Or, I may compare the complete test circuit with a similar circuit X, as illustrated in Fig. 5, which may be the winding of a similar machine known to have no fault.

Machines having the phase terminals brought out so as to be connected in delta or y may of course be tested as explained in connection with Fig. 1. Also, I may use the connection illustrated in Fig. 6.

Single phase machines or machines with one continuous winding may be tested by the connection illustrated in Fig. 7, where 61 represents the winding to be tested and 61' represents a similar winding.

Fig. 8 represents how the method may be applied to the comparison test of insulators. In this case if the insulators are equally good and of similar design they will act like similar condensers. In Figs. 5 to 8 it will be understood that the synchronous reversing switch 7—8 or its equivalent is to be included in the surge circuit connections and has been indicated schematically. In any case where the surge potential at the midpoint of the test circuit is too large for the oscillograph, a capacitance type voltage divider such as represented 15—14, Fig. 1, may be introduced into the connection to the oscillograph.

In Fig. 3 I have represented apparatus which differs primarily from Fig. 1 in that the synchronous switch 7 and 8 takes the place of tubes 31 and 33 of Fig. 1. In Fig. 3 the surge capacitor 4 is charged from transformer 18 through current limiting resistor 62. Only the charge of the positive half wave is utilized. At the crest of the positive half wave the synchronous switch 7—8 closes one side or the other of its diametrically opposite switch contacts, thereby discharging capacitor 4 through resistor 6 into either phase 3 or 2 of winding 45. At the instant of making the contact which starts the discharge either lead 63 or 64, depending on the switch position, is elevated to the potential of capacitor 4. This sharp rise of positive potential is transmitted to the grid 23 of sweep tube 22 through the respective coupling capacitor 65 or 66 causing it to fire and start the cathode beam moving along its time axis. In other respects the action is the same as that described for Fig. 1.

When it is desired to use this method of testing at voltage levels higher than those permitted by the use of tubes, I may use a surge generator of the character shown in Fig. 4 where several groups of charged capacitors are periodically connected in series to produce the surge. The series connection is established by means of rotating contact elements mounted on the same shaft as the reversing switch previously described in connection with Fig. 1.

The capacitor groups 67, 68, 69 are charged for a full cycle from transformer 70 through the full wave rectifier 71. The several capacitor groups are somewhat isolated from each other during discharge by the charging resistors 72. At the ends of the charging cycles the synchronous switch elements take alternately the position shown in Fig. 4 or a position 180 degrees from it.

At these positions the switch elements 73, 74, 75 serve to connect the capacitors in series and to connect one end of the series grouping to ground. The other end of the series connection which is now at a voltage equal to the sum of the separate capacitor voltages is connected to the test winding by means of a reversing switch 7, 8 similar to those already described. The switches 73, 74, 75, 7, 8 may each comprise a disk of insulating material having contact buttons 77 extending through or near their peripheries and spaced in line and 180 degrees apart as shown. These rotating contacts co-operate with sets of stationary contact buttons 78 for establishing the desired connections. Fig. 4 shows the switch in one of its closed positions with the direction of surge current flow indicated by single arrows. For the other position the current flow is indicated by the double arrows. The sweep circuit is not shown but a potential point 79 is shown for tripping the sweep tube through coupling capacitor 80. Point 79 is at negative potential while charging and drops to zero potential at the instant the discharge starts. This sudden loss of negative charge on the high side of capacitor 80 is equivalent in effect to the application of a positive voltage of the same magnitude to the capacitor 80 if it were in a discharged condition.

The method of test described enables coils, windings and other electrical impedance circuit devices to be tested very rapidly. A comparison test needs to last only long enough for a person to look at the screen and see if only one or two distinct waves appear. In a second's time 60 waves are traced on the screen. If they are all alike a single standing wave is seen. If 30 are of one size and the remaining 30 are of a different size, two distinct standing waves are seen, the two different sized waves alternating with each other. This latter indication indicates a fault. This insulation test reveals coil-to-coil, turn-to-turn, phase-to-phase and winding-to-ground insulation faults and incorrect connections. The test is particularly effective in revealing the kind of insulation faults likely to occur in service because the surge voltage employed is of the steep wave front variety which generally produces the service breakdowns.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The method of comparing the impedances of a pair of presumably similar impedance devices which consists in impressing similar, steep wave front voltage surges across a pair of such impedances connected in series and alternately in opposite directions and comparing the surge voltages which appear at the interconnection between said impedances under the reversed conditions.

2. The method of testing windings for insulation faults which consists in impressing similar, steep wave front voltage surges across a pair of presumably similar series connected winding sections in alternate directions to ground and comparing resulting surge voltage waves across said individual sections.

3. The method of comparing the reactances of a pair of windings which consists in impressing, alternating in opposite directions, similar steep wave front voltage surges across said windings in series and comparing the resultant surge voltage waves across said individual windings.

4. The method of testing windings for insulation faults which consists in impressing similar, steep wave front voltage surges across a pair of similar series connected windings in alternate directions to ground, producing visual indications of the resulting surge voltage waves across each of said sections separately to ground and comparing said visual indications.

NICHOLAS ROHATS.